United States Patent
Wang et al.

(10) Patent No.: US 10,558,805 B2
(45) Date of Patent: Feb. 11, 2020

(54) METHOD FOR DETECTING MALWARE WITHIN A LINUX PLATFORM

(71) Applicants: SICHUAN UNIVERSITY, Chengdu, Sichuan (CN); BEIJING TONGTECH CO., LTD., Beijing (CN)

(72) Inventors: Junfeng Wang, Chengdu (CN); Baoxin Xu, Beijing (CN); Dong Liu, Chengdu (CN); Fan Li, Chengdu (CN); Xiaosong Zhang, Chengdu (CN)

(73) Assignees: SICHUAN UNIVERSITY, Sichuan (CN); Beijing Tongtech Co., LTD., Beijing (CN)

( * ) Notice: Subject to any disclaimer, the term of this patent is extended or adjusted under 35 U.S.C. 154(b) by 245 days.

(21) Appl. No.: 15/645,767

(22) Filed: Jul. 10, 2017

(65) Prior Publication Data
US 2018/0082064 A1   Mar. 22, 2018

(30) Foreign Application Priority Data

Sep. 20, 2016   (CN) .......................... 2016 1 0834406

(51) Int. Cl.
*G06F 21/56*    (2013.01)
*G06N 20/00*   (2019.01)

(52) U.S. Cl.
CPC ........... *G06F 21/566* (2013.01); *G06N 20/00* (2019.01); *G06F 2221/033* (2013.01)

(58) Field of Classification Search
CPC ....... G06F 21/121; G06F 21/56; G06F 21/566
USPC ......................................................... 726/23
See application file for complete search history.

(56) References Cited

U.S. PATENT DOCUMENTS

| | | | | |
|---|---|---|---|---|
| 8,195,953 | B1* | 6/2012 | Yue ....................... | G06F 21/566 713/187 |
| 9,665,713 | B2* | 5/2017 | Avasarala ............... | G06F 21/56 |
| 2007/0294179 | A1* | 12/2007 | Krawetz ............... | G06F 21/121 705/59 |
| 2013/0326625 | A1* | 12/2013 | Anderson ............... | G06F 21/56 726/23 |
| 2014/0137184 | A1* | 5/2014 | Russello ................. | G06F 21/60 726/1 |
| 2017/0091428 | A1* | 3/2017 | Johnson .................. | G06F 21/10 |
| 2017/0124322 | A1* | 5/2017 | Guilley ..................... | G06F 8/75 |

* cited by examiner

*Primary Examiner* — Bryan F Wright
(74) *Attorney, Agent, or Firm* — Oliff PLC

(57) ABSTRACT

A method of detecting malware in Linux platform through the following steps: use objdump-D command to disassemble ELF format benign software and malware samples to generate assembly files; traverse the generated assembly files one by one, read the ELF files' code segment and meanwhile identify whether the code segment contains main( ) function; analyze the code segment read. Divide assembly code into different basic blocks. Each basic block is marked by its lowest address. Add control flow graph's vertex to the adjacency linked list; establish the relation between basic blocks, add control flow graph's edges to the adjacency linked list and generate a basic control flow graph; extract control flow graph's features and write them into ARFF files; take ARFF files as the data set of a machine learning tool named weka to carry out data mining and construct classifier; classify the ELF samples to be tested by using the classifier.

6 Claims, 1 Drawing Sheet

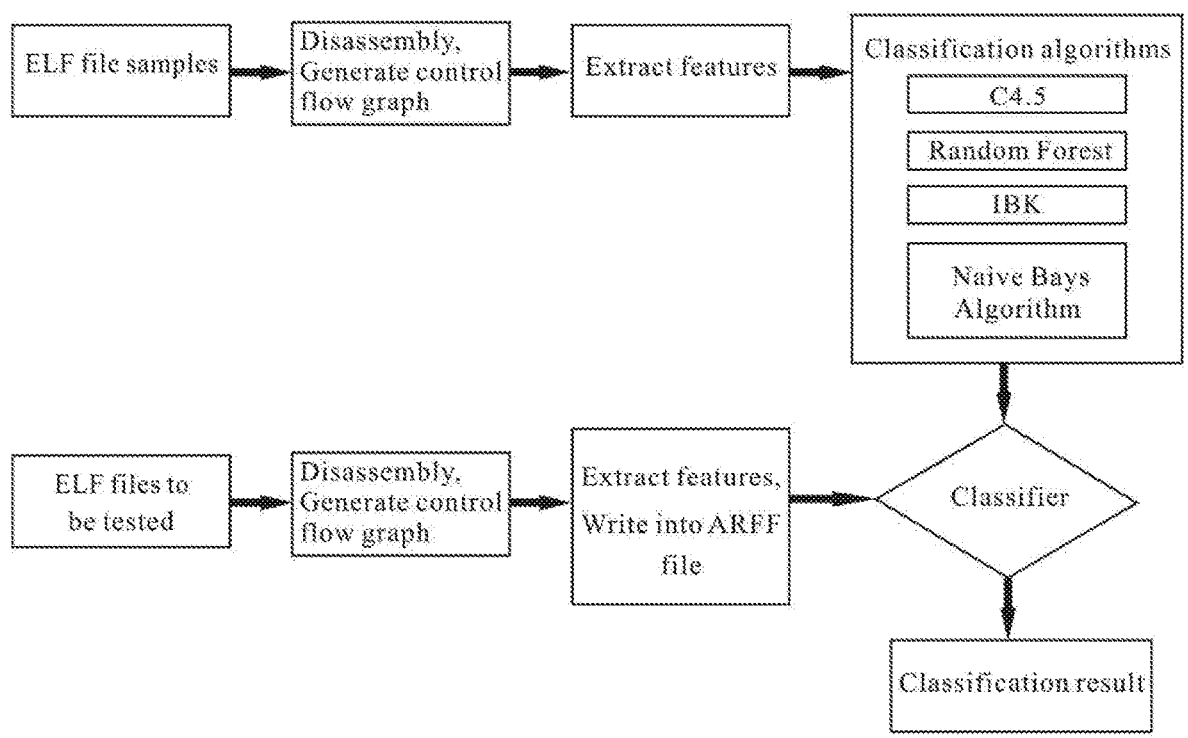

METHOD FOR DETECTING MALWARE WITHIN A LINUX PLATFORM

TECHNICAL FIELD

The present invention relates to the technical field of computer malware detection, in particular relating to a malware detection method suitable for Linux operating system ELF format.

BACKGROUND TECHNOLOGY

Malware, such as viruses, worms, Trojans, etc, refers to software that destroys users' computers and infringes their legitimate rights and interests without their permission, In recent years, malware is widespread and uncurbed, having a serious impact on users' work and life. According to a research reportMal of domestic security vendor 360, in 2014, there were a total of 324 million new malicious program samples with an average daily increase of 888 thousand. Malicious program attacks have been intercepted for 57.27 billion times with an average daily interception of 157 million times.

Linux operating system is a completely open operating system. Anyone can obtain source code to carry out secondary development. After years of development, it has become a mature and complete system. Increasingly more individual users start to choose this operating system for daily use and development. With the wide application of Linux operating system, more and more hackers pay attention to this platform. As a result, malware in Linux platform gradually increases. In the past, people believed that Linux operating system was very safe and malware did not exist. However, this recognition has been gradually subverted and the safety problem of Linux platform has become more and more serious.

Researches on Linux platform malware detection are not enough and they are mainly based on feature code. In the current situation, the traditional code feature based detection method constitutes a feature code database, which extracts the feature code of malware, and then compares with the feature code from the feature code database through scanning the software information to obtain the detection conclusion. This method is feasible and effective to detect the known malware, so it is widely used in the existing anti-virus software. The current development of this method lies in improving the accuracy and detection speed of feature code. However, considering the current development of malicious programs, this method cannot detect new malware. The detection lags behind. It is necessary to update feature database constantly. Weaknesses gradually expand.

Some of the new malware detection methods do not use feature codes, but carry out detection based on behavior features or head information of software for comparison. All of these methods constitute an index set by mining malware local information and making use of the index set to classify software, but there are still some deficiencies. The fuzzy and polymorphic malware used in the behavior-feature-based detection has unfixed local features. It is difficult to obtain an accurate result by comparing it to the index set. Therefore, this method does not have high accuracy for determining such malware. The index used in the software-head-information-based detection is software descriptive information. This information cannot reflect the software behavior accurately. For experienced malware developers, it is easy to be modified and confused so that the detection effect of this detection method is significantly reduced.

The Contents of the Invention

The technical problems to be solved by the present invention is to provide a detection method for Linux platform malware, deal with new or unknown malware, the size of feature database and the increase of feature matching time index and the constant update problems that cannot be detected by code-feature-based detection method, and use machine learning methods to detect malicious software.

To solve the above-mentioned technical problems, the technical proposal adopted by the present invention is:

A detection method for Linux platform malware includes the following steps:

Step 1: In the Linux operating system, use objdump-D command to disassemble ELF format benign software and malware samples to generate assembly files;

Step 2: Traverse the generated assembly files one by one, read the code segment of ELF files and identify whether the code segment contains main( ) function in the same time;

Step 3: Analyze the code segment read in step 2. If there is main function in the code segment, then starting from the entry address of main( ) function, otherwise starting from the entry address of the code segment, traverse all assembly instructions and divide assembly code into different basic blocks in accordance with the address in ascending order. Each basic block is marked by its lowest address, and adds the vertex of the control flow graph to the adjacency linked list;

Step 4: Analyze the code segment read in step 2 again. If there is main( ) function in the code segment, then starting from the entry address of main( ) function, otherwise starting from the entry address of code segment in a sequential and recursive way, analyze each branch and jump instruction, ignore indirect jump and branch instructions, confirm the target address of branch and jump instructions, establish the relation between basic blocks, and add the edges of control flow graph to the adjacency linked list and meanwhile determine the type of basic blocks to generate a basic control flow graph according to the address ascending order and the construction rules of control flow graph;

Step 5: Extract the features of the control flow graph generated in step 4, and write all the features extracted from the samples into ARFF file;

Step 6: Take ARFF file generated in step 5 as the data set of a machine learning tool named weka, carry out data mining by using decision tree-based C4.5 algorithm, RamdomForest algorithm, IBK in the lazy classification algorithm and one of the NaiveBays algorithms and use m-fold cross validation to generate training set and decision tree, choose an algorithm with the best classification effect to construct a classifier, and classify the samples to be tested by using the constructed classifier;

Step 7: Construct a control flow graph for ELF samples to be tested, extract the features of the control flow graph and write them into ARFF files. The files are used as the input of the classifier constructed in step 6. The output of the classifier is the classification result.

According to the above proposal, step 4 also includes the supplement and repair to the generated control flow graph.

According to the above proposal, the partition rules of the basic blocks in step 3 are:

The program entry address is a basic block;

The target address of direct jump and branch instructions is a basic block, the jump and branch instructions are in the address ascending order, and the next address of non-null-operation instructions is a basic block;

Ignore indirect jump instructions, and ignore instructions with target address of direct jump and branch instructions as its own address.

According to the above proposal, the construction rules of the control flow graph in step 4 are:

A basic block is a vertex of the control flow graph, which is identified by the entry address of basic block without edge weights;

Each direct jump and branch instruction is represented by directed edges in the control flow graph;

For unconditional direct jump and branch instructions, a directed edge pointed from the basic block where the instruction is located to the basic block marked by the target address is established. For conditional jump and branch instructions, two directed edges are established;

The basic block where the return instruction is located has a directed edge pointing to the basic block where "the next instruction of the jump instruction correspondent to that return instruction" is located;

For recursive calls, add only one directed edge with the basic block pointing to itself.

According to the above-mentioned proposal, 22 features are extracted respectively: the total number of vertices, the total number of edges, the vertex number of function in import table, the maximum out-degree, the number of vertices that identify function names when disassembling, the number of vertices with in-degree as zero, the number of vertices with out-degree as zero, the maximum degree of graphs, the maximum in-degree, the number of vertices included in the maximal connected subgraph, the number of edges pointing to the vertices of import table, the number of vertices with both out-degree and in-degree as zero, the number of edges pointing to the vertices that identify function names when disassembling, the proportion of the vertices in import table to the total vertices, the number of connected sub-graphs, the proportion of vertices that identify function names, the proportion of vertices with in-degree as zero, the proportion of vertices with out-degree as zero, the proportion of vertices included in the maximal connected subgraph, the proportion of vertices with both out-degree and in-degree as zero, the proportion of the number of edges pointing to the vertices of import table to the total edges, the proportion of the edges pointing to vertices that identify the function name.

Compared with the existing technology, the invention has the beneficial effects: 1) it is not necessary to directly compare the huge feature database. The speed is faster and the unknown malware can be detected. 2) the classifier is small with fast training speed. The feature used is only the extracted subset of 22 features. 3) when the classifier is updated, it only needs to expand and update data set to train classifier, which takes less time. As the classifier updates, the detection time will not increase significantly. 4) compared with the methods based on software description information and local features, this method is more stable, and it is more difficult for malicious software developers to make targeted response to avoid detection.

DESCRIPTION WITH DRAWINGS

FIG. 1 is the invention of detection schematic diagram of a Linux platform malware detection method of.

SPECIFIC IMPLEMENTATION

The following drawings and specific implementation further describe the invention in detail. As shown in FIG. 1, the invention provides a detection method for Linux platform malware, which comprises the following steps:

Step 1: In the Linux operating system, gcc is a standard compiler, and objdump command is a powerful binary analysis tool provided in gcc. Use objdump-D command to disassemble benign software and malware samples of ELF format (Executable and Linking Format) to generate assembly files.

Step 2: Traverse generated assembly files one by one and read "text", namely the code segment of ELF files and identify in the same time whether the code segment contains main function and the instruction set used by the assembly file.

Step 3: Analyze the code segment read in step 2. If there is main( ) function in the code segment, then starting from the entry address of main( ) function, otherwise starting from the entry address of the code segment, traverse all assembly instructions, compare with the instructions included in the instruction set, and analyze instruction types and functions in accordance with the address in ascending order and by referring to the instruction set obtained in step 2. Divide assembly code into different basic blocks according to its partition rules. Each basic block is marked by its lowest address, and adds the vertex of control flow graph to the adjacency linked list;

Step 4: Analyze the code read in step 2 again. If there is main( ) function in the code segment, then starting from the entry address of main( ) function, otherwise starting from the entry address of code segment, use a sequential and recursive way to traverse all assembly instructions, compare with the instructions included in the instruction set, and analyze instruction types and functions in accordance with the address in ascending order and by referring to the instruction set obtained in step 2. Analyze each branch and jump instruction, ignore indirect jump (branch) instructions, confirm the target address of branch and jump instructions, establish the relation between basic blocks, and add the edges of control flow graph to the adjacency linked list and meanwhile determine the type of the basic blocks to generate a basic control flow graph according to the construction rules of control flow graphs.

Step 5: Supplement and repair the control flow graph generated in step 4 so that a complete control flow graph is generated finally.

Step 6: Extract a total of 22 features of the control flow graph generated in step 5, as shown in the FIG. 1. These features, obtained by statistical method and algorithm in graph theory, basically meet the demand. The features extracted from all samples are written into ARFF file.

TABLE 1

22 extracted features of control flow graph

| Names of features | Description |
| --- | --- |
| vertexNum | Vertex number |
| edgeNum | Edge number |
| pltVexSize | The vertex number of the function in the import table |
| maxOutD | The maximum out-degree |
| namedVexSize | The number of the vertices that identify the function name when disassembling |
| zeroInDSize | The number of the vertices with in-degree as zero |
| zeroOutDSize | The number of the vertices with out-degree as zero |
| maxDegree | The maximum degree of graphs |
| maxInD | The maximum in-degree |
| MCSVexSize | The number of vertices included in the maximal connected subgraph |

TABLE 1-continued

22 extracted features of control flow graph

| Names of features | Description |
| --- | --- |
| pltEdgSize | The number of the edges pointing to the vertices of the import table |
| zeroIODSize | The number of vertices with both out-degree and in-degree as zero |
| namedEdgSize | The number of the edges pointing to the vertices that identify the function name when disassembling |
| pltVexRatio | The proportion of the vertices in the import table to the total vertices |
| CSnum | The number of connected sub-graphs |
| namedVexRatio | The proportion of the vertices that identify function name |
| zeroInDRatio | The proportion of the vertices with in-degree as zero |
| zeroOutDRatio | The proportion of the vertices without-degree as zero |
| MCSVexRatio | The proportion of the vertices included in the maximal connected subgraph |
| zeroIODRatio | The proportion of the vertices with both out-degree and in-degree as zero |
| pltEdgRatio | The proportion of the number of the edges pointing to the vertices of the import table to the total edges |
| namedEdgRatio | The proportion of the edges pointing to the vertices that identify the function name |

Step 7: Take ARFF file generated in step 6 as data set of a machine learning tool named weka, carry out data mining by using C4.5 algorithm, RamdomForest algorithm, IBK in the lazy classification algorithm and one of the BaiveBays algorithms in the Bayesian classification algorithm based on decision tree, and use 10-fold cross validation to generate training set and detection, and choose algorithm with the best classification effect to construct the classifier so as to classify the samples to be tested. After the test, the best choice is RandomForest algorithm.

Step 8: Construct a complete control flow graph for ELF samples to be tested according to the forgoing steps, extract the features of the control flow graph and write them into ARFF files. Use the classifier constructed in step 7 to classify samples.

In the described step 4, if there is main( ) function in the code segment, traverse assembly instructions in a sequential and recursive manner. The specific operation is to divide code segment into multiple fragments based on the function identified in the code segment when disassembling. As to a single fragment, traverse analysis instructions from the lower address in order. If the target address of jump (branch) instruction is within other fragments instead of this fragment, and this fragment has not been traversed, then recursively traverse and analyze this fragment. If there is no main( ) function, starting from the entry address of the code segment, simply adopt the sequential traversal way to analyze the instructions according to the address ascending order.

Determine the type of basic block, which is to divide the basic block where the instructions are located into 12 types according to the type of the instruction while referring to the program execution: ENTRY, JUMP_COND, JUMP_LINK_UNC, JUMP_LINK_COND, JUMP_UNC, BRANCH_COND, BRANCH_LINK_COND, BRANCH_UNC, BRANCH_LINK_UNC, BROKEN, RETURN, END. ENTRY is program entry, END is program exit, RETURN is return and BROKEN is a broken basic block: namely the established ending is a basic block of jump (branch) instructions. There is another jump instruction pointing to an address within the basic block, so the basic block is split into two basic blocks. If the end of the basic block with the lower address scope is not a jump (branch) instruction, then it is a broken basic block. The other types are composed of the following keywords: JUMP (jump), BRANCH (branch), COND (conditional), UNC (unconditional), LINK (Link namely this instruction will use link register to save subprogram return address). Refer to the official manual of the instruction set for the classification of the instructions.

In the described step 5, the supplementary control flow graphspecifically contains the following two points:

1) Establish edges for Broken-type basic blocks: find out all sub-basic-blocks after the original complete basic block is split. These sub-basic-blocks include the basic blocks with the highest address scope, and the remaining are Broken types. Between these sub-basic-blocks, establish directed edges with the basic block of lower address scope pointing to the basic block of higher address scope according to the address ascending order. For example, basic block A is split into three basic blocks A1 (low address), A2, A3 (high address). A 1, A2 are Broken type. There are two directed edges (A1→A2, A2→A3) after repair.

2) Determine that the target address of return instruction is based on the basic control flow graph established in step 4. Find out the jump instruction correspondent to the return instruction and establish corresponding directed edges.

In the described step 7, compare the classification performance differences of the decision-tree-based C4.5 algorithm, RandomForest algorithm, IBK of lazy classification algorithm and BaiveBays algorithm of Bayesian classification algorithm under the given 507 samples so as to obtain the best option. The specific operation of the comparison test is to collect 202 malware samples in Linux system ELF format, select 303 benign software with the file size in the Linux system similar to that of malware samples for disassembly, establish a control flow graph, extract 22 features, save these features in ARFF file and use C4.5, RandomForest, IBK, BaiveBays to carry out 10-fold cross validation on the data. The results are as shown in table 2:

TABLE 2

The data mining comparison of various algorithms

| Classification algorithm | C4.5 algorithm | | RandomForest algorithm | | IBK algorithm | | BaiveBays algorithm | | Types |
| --- | --- | --- | --- | --- | --- | --- | --- | --- | --- |
| | Precision | Recall | Precision | Recall | Precision | Recall | Precision | Recall | |
| Test results | 0.993 | 0.987 | 1.000 | 0.993 | 0.993 | 0.993 | 0.981 | 0.997 | Benign |
| | 0.980 | 0.980 | 0.990 | 1.000 | 0.990 | 0.990 | 0.995 | 0.970 | Malicious |
| | 0.988 | 0.988 | 0.996 | 0.996 | 0.992 | 0.992 | 0.968 | 0.986 | Weighted mean |

TABLE 2-continued

The data mining comparison of various algorithms

| Classification algorithm | C4.5 algorithm | | RandomForest algorithm | | IBK algorithm | | BaiveBays algorithm | | Types |
|---|---|---|---|---|---|---|---|---|---|
| | TP Rate | FP Rate | TP Rate | FP Rate | TP Rate | FP Rate | TP Rate | FP Rate | |
| | 0.987 | 0.010 | 0.993 | 0.000 | 0.993 | 0.010 | 0.997 | 0.030 | Benign |
| | 0.990 | 0.013 | 1.000 | 0.007 | 0.990 | 0.007 | 0.970 | 0.003 | Malicious |
| | 0988 | 0.011 | 0.996 | 0.003 | 0.992 | 0.009 | 0.986 | 0.019 | Weighted mean |

Precision indicates the proportion of the correct instance number to the total instance number in the classification result for a category. Recall represents the proportion of the correctly identified instance number to the total instance number of the category in the samples. TP Rate represents the proportion of the correctly classified number to the total instance number for the samples of a classification. FP Rate represents the proportion of the misclassified instance number to the total instance number of the classification for some classification result.

The invention claimed is:

1. A method for detecting malware on a Linux platform within a computing, environment comprising:

using an objdump-D command in a Linux operating system to disassemble an ELF format benign software and a plurality of malware samples to generate a plurality of assembly files including a plurality of assembly instructions;

traversing the plurality of generated assembly files one by one, reading a code segment of the ELF format benign software while identifying whether the code segment contains a main( ) function;

analyzing the code segment, starting from an entry address of the mainO function if the main( ) function is in the code segment, and otherwise starting from the entry address of the code segment, traversing all of the assembly instructions and dividing the ssembly instructions into a plurality of basic blocks in accordance with a lowest address of each basic block in ascending order, and adding a vertex of a first control flow graph to an adjacency linked list;

analyzing the code segment starting from the entry address of the mainO function if the main( ) function is in the code segment, and otherwise starting from the entry address of the code segment, using a sequential and recursive way to analyze each branch and jump instruction, ignoring indirect branch and jump instructions, confirming a target address of each branch and jump instruction, establishing a relation between the basic blocks, adding a plurality of edges of the first control flow graph to the adjacency linked list while determining a type of each of the basic blocks to generate the first control flow graph according to the lowest address of each basic block in ascending order and according to construction rules of control flow graphs;

extracting a plurality of features from the first control flow graph and writing all of the features extracted from the malware samples into a plurality of ARFF files;

taking the ARFF files as the data set of a machine learning tool carrying out data mining by using a decision-tree-based C4.5 algorithm, RamdomForest algorithm, IBK of lazy classification algorithm and one of the Baive-Bays algorithms in the Bayesian classification algorithm, using m-fold cross validation to generate training sets and decision trees, choosing an algorithm with a classification effect to construct a classifier and using the constructed classifier to classify a plurality of ELF samples to be tested;

constructing a second control flow graph for the plurality of ELF samples to be tested, extracting a plurality of features of the second control flow graph and writing the plurality of features of the second control flow graph into an input ARFF file, the input ARFF file being used as an input of the classifier and an output of the classifier is a classification result.

2. The method of claim 1, further comprising supplementing and repairing the first control flow graph.

3. The method of claim 1, wherein:

a program entry address is a lowest address of one of the basic blocks;

the target address of each of direct branch and jump instructions is the lowest address of one of the basic blocks, and the target address of each of the branch and jump instructions is used to divide the assembly instructions into the basic blocks in ascending order, and a next address of non-null-operation instructions is a lowest address of one of the basic blocks; and each of the indirect branch and jump instructions are ignored, and instructions having the direct branch and jump instructions as a target address are ignored.

4. The method of claim 1, wherein the construction rules of the first control flow graph include:

a basic block is the vertex of the first control flow graph, which is identified by the entry address of the basic block without edge weights;

each direct jump and branch instruction is represented by directed edges in the first control flow graph;

for unconditional direct jump and branch instructions, a directed edge with the basic block where the instruction is located pointing to the basic block marked by the target address is established, for conditional jump and branch instructions, two directed edges are established;

the basic block where a return instruction is located has a directed edge pointing to the basic block where the next instruction of the jump instruction correspondent to that return instruction is located; and for recursive calls, add only one directed edge with the basic block pointing to the basic block including the recursive call.

5. The method of claim 1, wherein 22 types of features are extracted, including:

a total number of vertices, a total number of edges, a vertex number of function in an import table, a maximum out-degree, a number of vertices that identify function names when disassembling,
a number of vertices with an in-degree as zero,
a number of vertices with an out-degree as zero,
a maximum degree of graphs,
a maximum in-degree,
a number of vertices included in a maximal connected subgraph,
a number of edges pointing to the vertices of the import table,
a number of vertices with both the out-degree and the in-degree as zero,
a number of edges pointing to the vertices that identify a function name when disassembling,
a proportion of vertices in the import table to the total number of vertices,
a number of connected sub-graphs,
a proportion of vertices that identify a function name,
a proportion of vertices with the in-degree as zero,
a proportion of vertices with the out-degree as zero,
a proportion of vertices included in the maximal connected subgraph,
a proportion of vertices with both the out-degree and the in-degree as zero,
a proportion of the number of edges pointing to the vertices of the import table to the total number of edges, and
a proportion of edges pointing to vertices that identify function names.

6. The method of claim 1, wherein the code segment is extracted from the generated assembly files.

* * * * *